Patented Nov. 11, 1952

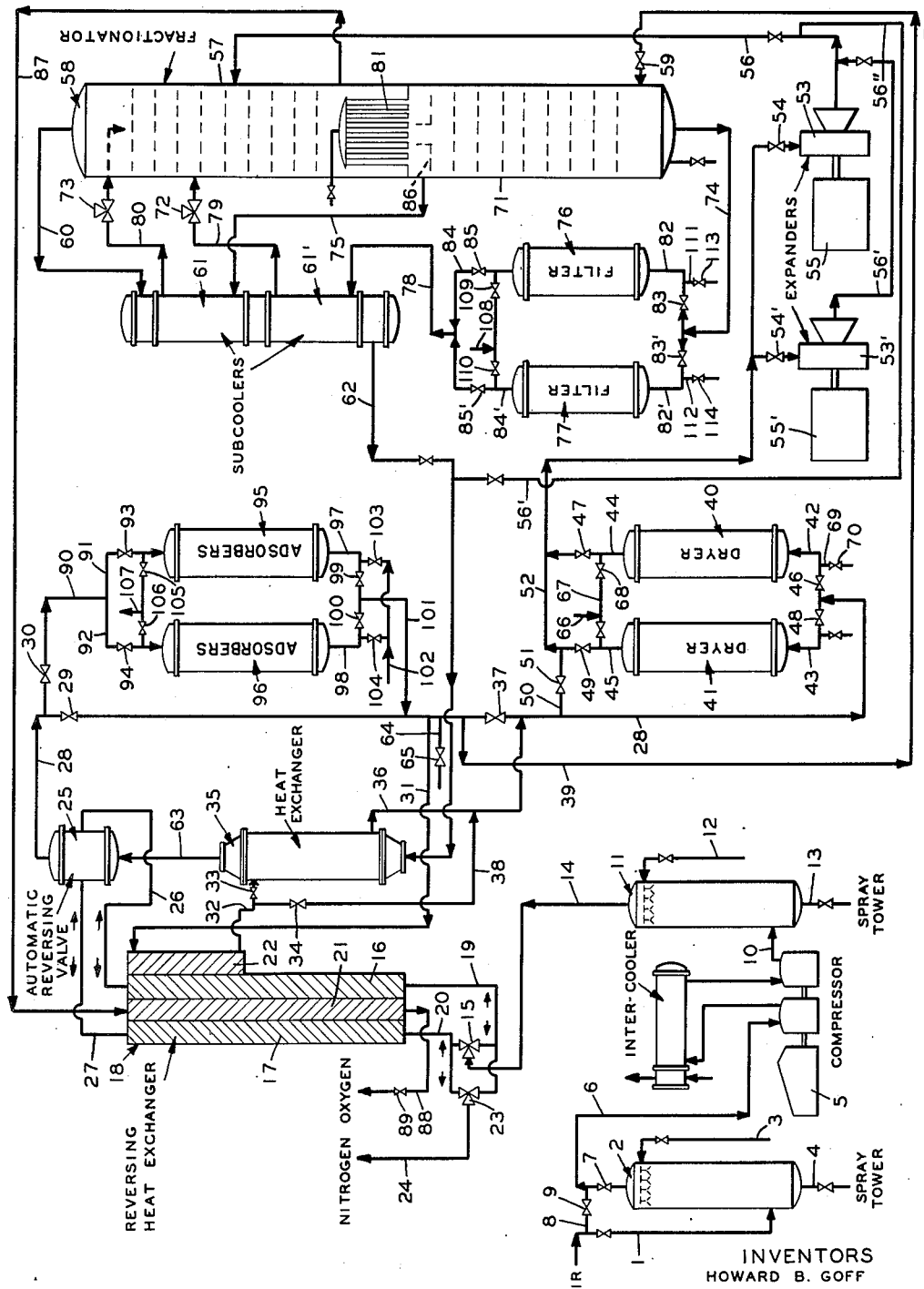

2,617,275

UNITED STATES PATENT OFFICE 2,617,275

SEPARATION OF GASEOUS MIXTURES

Howard B. Goff and Walter E. Lobo, Westfield, N. J., assignors to The M. W. Kellogg Company, Jersey City, N. J., a corporation of Delaware Application January 6, 1948, Serial No. 654

4 Claims. (Cl. 62—175.5)

This invention relates to improvements in the process of separating gaseous mixtures by liquefaction and fractionation, wherein the gaseous mixture is cooled by heat exchange relation with products of the separation with attendant precipitation of higher boiling components from the gaseous mixture.

Gaseous mixtures containing higher boiling components have been thus separated without prior treatment to remove the higher boiling components by employing at least one stream of product for this purpose in connection with the heat exchange relation between the products and the gaseous mixture. However, this method for removing higher boiling components has the inherent disadvantage in that any portion of the higher boiling components which the stream of product fails to remove, is swept into the latter stages of the process. Such failure is especially pronounced during starting up periods before the products either have been formed or at least reached a sufficiently cold temperature to effectively precipitate the higher boiling components. This invention, therefore, more particularly relates to the removal of higher boiling components from the gaseous mixture which are unprecipitated during the aforementioned heat exchange relation.

Gaseous mixtures, such as atmospheric air or low molecular weight hydrocarbons, are separated under conditions of temperature and pressure at which the gaseous feed and its several components can exist in the liquid phase. The separation usually is accomplished by fractionation wherein one of the components is utilized to provide the liquid reflux. In the case of atmospheric air, the separation of which into its oxygen-rich and nitrogen-rich components will be described as illustrative of gaseous mixtures within the scope of the present invention, the normal boiling point of the more volatile nitrogen component which is employed as liquid reflux is $-320°$ F. and the separation necessarily must be conducted therefore at extremely low temperatures. To effect fractionation at these extremely low temperatures, the air is compressed to a pressure which is sufficient for the condensation of the nitrogen component at the lowest temperature from which the heat of its condensation can be removed. Hence, this method of separation requires low temperature refrigeration and further necessitates the removal of higher boiling components normally associated with atmospheric air such as water, carbon dioxide, and hydrocarbons, that can clog restricted passages in the low temperature zones of the process or be carried through the several stages to become undesirably present in the oxygen-rich component.

According to a method employed, heretofore, for the separation of atmospheric air, the feed air is compressed only as much as is necessary to overcome the flow resistance of the piping and equipment arrangement between the compressing step and nitrogen-condensing means and as is necessary to enable the desired condensation of substantially pure nitrogen to occur. Pursuant to this process, the separation of the air conveniently is effected in two fractionation stages and, in this event, a rough fractionation is made in the first stage under a pressure sufficient for the heat of condensation of the nitrogen reflux to be relinquished to liquid oxygen boiling in the second stage. Then the oxygen-enriched liquid air thus obtained, together with exhaust vapors from an expansion engine, is fractionated in the low pressure second stage with liquid nitrogen condensed in the first stage providing the reflux. For such fractional distillation, the compressed air without previous chemical purification is cooled to approximately the required feed temperature for introduction into the rough fractionation, or the first stage air enrichment procedure. This temperature reduction is effected by heat exchange between the air and the oxygen-rich and nitrogen-rich products in cold accumulators or regenerators in which the heat exchanging streams are periodically reversed. Simultaneously with the temperature reduction, the air also is purified of its contained water vapor, and carbon dioxide by reason of the fact that these substances cannot remain in the vapor phase at the temperatures and pressures prevailing in the heat exchange relationship. These impurities are precipitated on the metallic surfaces in the heat exchange passageways as the air is cooled, and subsequently are removed therefrom by employing the periodically reversed operation between the air and at least one of the products. To compensate for loss of cold, i. e., refrigeration, in the outgoing products leaving the warm outlet end of the heat exchange zone and through heat infiltration in cold parts of other stages of the separation, a portion of the compressed air is expanded in a low temperature expansion engine performing external work. The cold vaporous air exhausted from the expansion engine is then introduced into the second stage of the fractionation tower as heretofore mentioned. More recently, reversing exchangers have been substituted for the reversing accumulators or regenerators in such low pressure processing procedures.

These fractional distillation processes, in which the air is not dried and chemically purified previously to its use as feed material, inherently have a detrimental operating disadvantage over the earlier processes employing pretreated feed in that, during the starting up period before the backward-returning products are sufficiently cold to cool the incoming air to the low temperature necessary for effecting fractionation, the aforementioned impurities are not deposited in the heat exchange zone but are carried onward with the air to latter process stages. This carry-over of impurities is detrimental because both the moisture and the carbon dioxide can seriously interfere with the operational functions of the several stages of the process, such as the expansion engine and the fractionator, as the temperature drops toward equilibrium operating conditions. For example, moisture originating from the water vapor in the atmospheric air contaminates the lubricating oil within the expansion engine which thereupon emulsifies and makes the bearings of the engine run hot. Further, during this initial period of the operation, both water and carbon dioxide solidify at the turbine nozzle and on the blades of the rotor. This not only restricts the flow through the expander but also impairs the efficiency of the machine and may possibly cause the rotor to become unbalanced with damaging effects.

The principal object of the method described herein, is to both dry the compressed gaseous mixtures used as feed to such "so-called" low pressure systems and to remove other vaporous or solidified high boiling components therefrom particularly during the initial, or starting-up, period of operation by utilizing a body of granular solid adsorptive material subsequent to the heat exchange step. This method is employed irrespective as to whether reversing regenerators or exchangers are employed for precooling the compressed air. Other objects and advantages as may hereinafter become apparent or are incident to the invention, are accomplished by means of an arrangement illustrated in the accompanying drawing which is a diagrammatic representation in elevation of apparatus adapted to carry out the invention in a process for separating atmospheric air by liquefaction and fractionation at low temperatures and under moderate superatmospheric pressure.

Referring to the drawing, atmospheric air to be compressed and separated into its oxygen-rich and nitrogen-rich output products is first introduced by way of line 1 into air scrubber 2 and scrubbed therein with a water spray fed to a plurality of spray nozzles through valved line 3. In this manner, dust, soot, ash, or other solid particles capable of damaging the compressing equipment are removed from the air and passed from the scrubber through valved line 4. The scrubbed air is then admitted to the two-stage turbine driven centrifugal compressor 5 by means of line 6 having valve 7 positioned therein. A bypass line 8, having valve 9, connects line 1 with line 6. In compressor 5 the air is compressed with interstage cooling to a moderate pressure of about 88 pounds per square inch gauge. After compression, the air flows through line 10 at 360° F. and is after-cooled by direct contact with water in spray cooler 11 to approximately 92° F. Valved line 12 supplies the cooling water to the spray nozzles while the valved line 13 conducts used coolant to the sump. In this manner, the greater part of the condensed water vapor is removed from the air. The air is then taken through line 14 to reversing valve 15 whereafter it is introduced into the reversing passageways 16 or 17 of exchanger 18 by way of lines 19 and 20 respectively. To reduce hazards and operating difficulties, it may be desirable in some instances to treat the air before it enters the exchanger for the removal of any hydrocarbons such as acetylene. While this treatment may be accomplished in any desired manner, it may conveniently be done according to a method not shown on the drawing by subjecting the warm compressed air from the compressor directly to the catalytic action of a suitable catalyst, as for example, one containing a mixture of copper and manganese. If necessary to remove hydrocarbon oil appearing in the air from the compressor lubricant, a suitable filter may be inserted in line 10 between the compressor and the chemical treating step.

Exchanger 18 consists of a multi-stream arrangement comprising four passageways for the flow of air, oxygen-rich and nitrogen-rich products and a separate stream of vaporous material which may be either a part of the cooled effluent air from the exchanger or a part of the nitrogen-rich product removed from the stream of this material before the introduction thereof into the exchanger as hereafter described. Passageways 16 and 17 of the exchanger are the "reversing passages" which alternately carry compressed air and nitrogen-rich product in counter-current heat exchange relationship with each other. These passageways are similar in flow resistance and extend over the whole length of exchanger 18. Passageway 21, carrying the oxygen-rich product counter-currently to the flow of the compressed air, likewise extends over the whole length of the exchanger, but the fifth passageway 22, frequently called the "unbalance passage" because additional heat exchange is effected by the material carried therethrough, is shorter and usually is incorporated only into the colder section of the exchanger. In the drawing, exchanger 18 is shown diagrammatically to represent in sectional elevation a rectangular heat exchanger constructed of a number of rectangularly shaped passageways. This particular construction of the exchanger is not essential as other forms of construction are just as applicable to the performance of the function of this apparatus. It is desirable, however, that the passageways, particularly the two similar passageways 16 and 18 which are employed for "reversing" be packed with a metallic packing material which may be of any suitable character and conveniently may consist of a multiplicity of closely spaced pins, coils of edge wound metallic ribbon, longitudinally placed strips of metal or the like. Furthermore, to provide for greater thermal efficiency, it is preferable that the metallic packing be affixed to the walls of the several passageways with a suitable metal to metal bonding material such as, for example, solder. In the event that exchanger 18 be constructed so that its individual passageways do not have common boundary walls as illustrated by the drawing, it is preferable to metal bond the passageways into a single integral unit. It is to be understood that although heat exchanger 18 is shown in the drawing to diagrammatically represent a counter-current heat exchanger vessel, the invention is not limited to this type of heat exchange zone since it is equally applicable to processing arrangements involving the use of regenerator type vessels. Furthermore, separate heat exchange vessels may be employed for exchanging heat between separate portions of the compressed air and each of the product streams.

During the normal operational period when the process is performing the separation of air to produce the desired products, it is the function of heat exchanger 18 to reduce the temperature of the incoming air to approximately −267° F. This is done by counter-current heat exchange relation with the cold nitrogen-rich and oxygen-rich products passing in backward-return through the exchanger. To direct the flow of the incoming compressed feed air alternately into lines 19 and 20 and thus into passageways 16 and 17 at frequent periodic intervals of time, usually of about three minutes duration, the construction of valve 15 is of the reversing type. That is, this valve has a single inlet, opening to the flow of incoming air, and two outlet openings, one leading to line 19 and the other leading into line 20 with suitable internal construction to direct the flowing air into either one of the two outlet connecting lines. Valves 15 and 23 are shown in the drawing to diagrammatically represent reversing type valves, no attempt being made to illustrate the actual construction of the valves or the apparatus by which they are operated as such is not essential to this description. Preferably, valve 15 is operated periodically by an automatic timing device in such a way that the valve settings are periodically changed to divert the compressed air alternately into line 19 or line 20 at the proper intervals of time. Reversing valve 23 is mechanically arranged, by means not shown on the drawing, to cooperate with the periodic action of valve 15. It is the function of valve 23 to direct the flow of the backward-returning nitrogen-rich product that also is passing alternately through lines 19 and 20, from these lines to the single outlet line 24 for removal from the system.

The incoming compressed air passes alternately from lines 19 and 20 into the warm end of passageways 16 and 17 of exchanger 18 and, in passing therethrough in counterflow heat relation with the cold products of the separation gives up its heat to these products and is thereby cooled. As the compressed air temperature is reduced, first water as liquid, then as ice, and finally carbon dioxide as a solid, precipitate from the air and are deposited in the exchanger. Were the flow of compressed air and nitrogen-rich product not interchanged between passageways 16 and 17, the accumulation of solid deposits such as that formed of solid carbon dioxide, would block the exchanger. However, reversing valve 15 with valve 23 cooperating therewith periodically diverts the air into the alternate passageway which has been carrying the nitrogen-rich product and this change in flow causes the mechanism of reversing valve 25 to respond automatically to the change so that the nitrogen-rich product is immediately switched from the passageway which has been carrying it into the passageway that has just been carrying the air. Valve 25 is shown diagrammatically in the drawing to represent a reversing valve arrangement containing a plurality of valved ports having closures actuated by springs capable of automatically and quickly responding to pressure changes in lines 26 and 27 as such changes result from the actions of valves 15 and 23. The streams of gaseous material in either of the reversing passageways thus are interchanged periodically before substantial amounts of solid deposits have been precipitated from the air, but the flow of each stream is always in the same direction. Because these two streams are in counterflow, the direction of gas flow, relative to the deposited impurities, is reversed by the action of valve 15 and in consequence of this fact, exchanger 18 is called a "reversing exchanger" and passageways 16 and 17 are designated "reversing passageways".

In this manner, the nitrogen-rich product stream, not only is utilized to abstract heat from the incoming compressed air but is employed also to remove the higher boiling components of the air that have been deposited in the reversing passageways as a result of the temperature reduction. The nitrogen-rich stream is therefore a "scavenging stream" as well as a cooling medium. Inasmuch as this stream consists of a product obtained by fractionation of the air after pressure reduction, it has a greater capacity to hold water or carbon dioxide in the vapor state than does the compressed air stream at the same temperature. This tends to compensate for the smaller comparative quantity of material in the scavenging stream over the quantity of the compressed air stream by the removal of the oxygen-rich components from the latter stream as a result of the separation. Irrespective of this fact, however, complete removal of the deposited components from a given passageway of the exchanger normally is not attained by the evaporative action of the nitrogen-rich stream because the nitrogen-rich stream, necessarily colder than the air at all points in the exchanger, may be too cold to contain all the impurities previously laid down by the air on the metal surfaces of the passageway swept by the nitrogen-rich product.

Accordingly, to decrease the magnitude of temperature difference and to bring the heat exchange relationship between the air and the nitrogen-rich product within operable conditions for complete removal of the deposited impurities and pursuant to a method used heretofore, the cooled compressed air is withdrawn from exchanger 18 at about −267° F. by way of either line 26 or 27, depending upon which passageway has been employed for the cooling. The withdrawn air is then conducted through the proper settings of the automatic reversing valve 25 and passed onward through line 28, valve 29 being opened and valve 30 being closed at this time. A portion of the cooled compressed air is withdrawn from the stream thereof in line 28 and sent by way of line 31 into the cold end extremity of passageway 22. Another portion of the air representing about 82.9 volume percent of the incoming compressed air is diverted from line 28 through line 39 for direct introduction into the fractionator. The first portion of air, representing in this case 7.5 volume percent of the incoming air, is passed continuously in counter-current heat exchange relation with the compressed air flowing through either of the passageways 16 or 17 of the exchanger. By means of this unbalancing of the heat exchange relation between the material being cooled and the material being warmed, the heat exchange conditions are suitably adjusted to ensure complete removal of the deposited impurities within the space of time allocated by the reversed operations of valves 15, 23, and 25.

Before diverting a portion of the cooled air through line 31, it may be desired to pass all of the air in line 28 through a body of adsorbent, such as granular activated carbon. For example, the adsorbent may be employed to remove acetylene from the air as a substitute method for the aforementioned chemical oxidation method or to clean up any acetylene which escaped conversion in that reaction. The granular adsorbent may also serve to screen particlese of solid carbon dioxide which may have been swept from the heat exchange zone. In this event, valve 29 is closed and valve 30 opened to allow the cooled air to flow through line 90 into either line 91 or 92 and pass through the respective valves 93 and 94 into adsorber 95 or 96. The effluent from contact with the adsorbent will then leave either by line 97 or 98 through the respective valves 99 or 100 and pass by way of line 101 back into line 28 downstream from valve 29. For regenerative purposes, a portion of the compressed air is taken from line 28 through valve 65 in line 64 and warmed by any convenient means, not shown in the drawing, such as by indirect heating with steam or by electric resistance heaters supplied by current from generator 55 or 55'. The warmed air is passed by way of line 102 through either of the valves 103 or 104 into line 97 or 98 and sent through the body of adsorbent undergoing regeneration in either vessel 95 or 96. The spent regenerative medium passes out by line 91 or line 92 through either valve 105 or 106 and is removed by line 107.

Return now to the material flowing through passageway 22. Having performed its function of reducing the temperature difference between the air and the nitrogen-rich streams in the colder parts of exchanger 18, the diverted 7.5 volume percent portion of the compressed air is withdrawn from the warm extremity of passageway 22 at about −120° F. in line 32, valve 33 being opened while valve 34 is closed, and is sent through heat exchanger 35 wherein it is cooled again to about −200° F. against the backward returning nitrogen-rich product. Such a temperature adjustment is required by reason of the fact that when this portion is returned from exchanger 35 through line 36 and combined in line 28 below control valve 37 with the 9.6 volume percent portion of the incoming cooled and compressed air which has been permitted to pass through the valve at −267° F., the two portions make up the desired quantity of air at a temperature of approximately −237° F., suitable for expansion entirely in the gaseous phase. For controlling the temperature of the air about to be expanded enough of the air leaving passageway 22 in line 32 may be permitted to pass through valve 34 and reach line 38.

The portion of the compressed air for expansion then is conducted by line 28 to either of the dryers 40 or 41 and introduced thereto and withdrawn therefrom by way of manifold lines 42 or 43 and 44 and 45 respectively, depending upon which of these dryers is on stream or on regeneration. In the event dryer 40 is on stream, valves 46 and 47 are opened while valves 48 and 49 respectively are closed. The drying medium employed may consist of any commercially known agent for this purpose and conveniently may be activated carbon, silica gel, or activated alumina in granular form but preferably silica gel is employed as the drying medium.

Normally, during the starting up period in processes of this character, all the air would be caused to follow a flow corresponding to the flow from line 28 through line 50, valve 51 being opened, directly into line 52 for introduction into expander 53 and 53'. The air then is cooled by expansion with production of external work such as, for example, by a 440 volt, 3 phase, 60 cycle generators 55 and 55', and directed thereafter through lines 56' and 56 into the low pressure section 57 of fractionator 58. Section 57 is gradually cooled in this manner as is the effluent passing through line 60, subcoolers 61 and 61', line 62, heat exchanger 35 and line 63 to automatic reversing valve 25 for backward-return through the heat exchange zone. The incoming compressed air resultantly also is gradually cooled to lower temperatures before expansion and consequently becomes expanded to progressively lower and lower temperatures. However, operational difficulties are associated with this method of starting up. For instance, the bearings of the expander become overly hot and the expander lubricant exhibits considerable frothiness. Likewise, an exceptionally great pressure drop through the turbine wheel appears and its speed frequently fluctuates from about 100 to 200 revolutions per minute. The frothiness and over-heated bearings indicate the presence of water in the turbine. Water and carbon dioxide freezing out in the wheel passages accounts for the high pressure drop and the erratic speed appears to result from the unbalancing of the turbine wheel due to an ice load and/or jamming of the wheel against the turbine case under peripheral ice load.

It now has been discovered that the foregoing difficulties may be entirely eliminated by passing all of the air from line 28 through either dryer 40 or 41, preferably filled with silica gel, from the very start of the operation. Accordingly, valve 51 is closed and valves 46 and 47 or 48 and 49 are opened. Thereupon all the incoming compressed air is made to flow through the body of silica gel before passing to the expanders through line 52. At these relatively high temperatures dryers 40 and 41 function mainly to adsorb water vapor from the air, the carbon dioxide vapor being substantially unaffected at this time by the solid adsorbent. The carbon dioxide, however, is not detrimental to expander operation since it is not solidified at the expanded gas temperature. Accordingly, it is the expansion of dry air in the expanders that now effectively cools with no operational difficulties the low pressure section 57, the apparatus in the path of the backward-returning air and the incoming air until the air about to be expanded reaches −40° F. At this time, inasmuch as the bulk of the water vapor initially contained in the feed air will be frozen out of the air and precipitated on the exchanger walls under the existing conditions, substantially all of the water in the air is removed from the system through the purifying action of the reversing exchanger.

At this time the dryer in operation is removed for regeneration of the adsorbent and, for the case where dryer 40 has been the dryer in operation, valves 46 and 47 are closed and valves 48 and 49 are opened. This takes dryer 40 from the path of the compressed air and places dryer 41 onstream. The regenerative medium is air which is removed from line 28 through line 64 in an amount as controlled by valve 65, warmed by means not shown on the drawing, and introduced through line 66, line 67, open valve 68, and line 44 into the top of dryer 40. By flowing through the dryer in a direction opposite to the previous flow of compressed air therethrough, the warmed air evaporates adsorbed water and purges it to the atmosphere by way of line 42 and line 69, valve 70 being opened for this purpose. In some events, it may be feasible not to operate with dryer 41 onstream during this regeneration period but to bypass the incoming air entirely around the dryers by means of the bypass line 50.

The foregoing procedure is maintained until the air about to be expanded reaches a temperature in the neighborhood of −100° F. At this time, valve 59 is opened slightly to permit some of the cold compressed air to be diverted from line 28 through line 39 into the high pressure section 71 of fractionator 58. The air has not been diverted previously through this section because of certain operational disadvantages. For example, had valve 59 been opened at a warmer temperature, the heat picked up by the air in section 71 would have raised the outgoing temperature of the air passing into exchanger 18 above −40° F. and in this case the compressed incoming air could not have been cooled in the exchanger sufficiently to ensure deposition of substantially all of its water vapor content therein. The air also is not started through section 71 at a temperature substantially lower than −100° F. because it is desirable to cool down fractionator 58 under conditions of maximum refrigeration rate. The higher the temperature of air going to the expander the higher is the refrigeration rate. Efficiency is practically independent of the temperature.

The cooling of the high pressure section 71 is maintained as described, until the air about to be expanded attains a temperature in the region of about −180 to −200° F. When this temperature level is attained, dryer 40 is again placed in the line and dryer 41, if it has been in use, is removed for regeneration. The incoming air again is caused to pass through the body of silica gel adsorbent since its temperature is approaching the solidification temperature of carbon dioxide and it is equally necessary to prevent formation of carbon dioxide snow during the expansion step. At these relatively low temperatures dryers 40 and 41 have the function of filtering solid particles, but more particularly of adsorbing vaporous carbon dioxide from the air about to pass through the expander. The dryer is not again taken off the line during the operational run unless it becomes necessary to subject it to regeneration since it may continue to serve to screen out any carbon dioxide escaping from the reversing heat exchange zone and to dampen temperature fluctuations particularly in the event regenerators are employed.

At the time when valve 59 is opened, valves 72 and 73 are also thrown wide open. This permits the air to leave section 71 through both outlet lines 74 and 75. The air leaving by way of line 74 flows through either of the filters 76 or 77, and then across connecting line 78 into subcooler 61′ whereafter it is introduced into section 57 by means of line 79. The portion of the air from section 71 passing through line 75 is taken through subcooler 61 and introduced into section 57 by means of line 80. As this method of cooling is continued, formation of liquid begins to occur in the subcoolers. This liquid subsequently finds its ways into section 57 of the fractionator and starts to build up in the bottom portion thereof. With the formation of a pool of liquid at the base of section 57, valves 72 and 73 are started to be closed and are throttled in stages. This gradually increases pressure in section 71 and consequently builds up liquid reflux therein by condensation of the nitrogen vapors within calandria 81 by vaporization of the liquid oxygen surrounding it. The resultant effect of the pressure increase and liquid formation in section 71 is the formation of a pool of liquefied oxygen-enriched air in the bottom of this section and the approach of the various temperatures throughout the whole system to the equilibrium conditions suitable for separating the air into the desired products. At this time, expander 53′ which has served to augment refrigeration is removed from the operation and the final adjustment of operating conditions accomplished with expander 53.

In the present operation under equilibrium conditions the temperature of the air passed to the expander is at −237° F. and after expansion falls to −301° F. at a pressure of 9 pounds per square inch gauge. The air entering section 71 through line 39 is at −267° F. Within section 71 this air is fractionated under a pressure of 84 pounds per square inch gauge into an oxygen-rich liquid bottoms product which represents about 41.5 volume per cent of the incoming air and into a substantially pure liquid nitrogen top product which represents about 41.4 volume per cent of the charge air.

The liquefied enriched air which contains 37 per cent oxygen is removed from the bottom of section 71 and passed by way of line 74 into line 82 or 82′, valve 83 or 83′ being opened, for passage through either filter 76 or 77. The filtering medium suitably consists of a body of adsorbing medium such as granulated silica gel held within screens which serve to filter out solids such as carbon dioxide or water ice or fines from previous adsorbers. The silica gel serves to adsorb light hydrocarbons such as acetylene. Regeneration of spent adsorbent is effected similarly to the method employed in connection with adsorbers 95 and 96 or dryers 40 and 41 by introducing some warmed air from line 64 into line 108 and passing this air through either valve 109 or 110 through one or the other of the filters counter-currently to the direction of the liquefied enriched air. The spent regeneration medium is then exhausted through vent lines 111 or 112, either valve 113 or 114 being opened for this purpose. From the filtering step, the liquefied air is conducted through either line 84 or 84′, valve 85 or 85′ being opened and then passed by way of line 78 into subcooler 61′. It is the function of the subcooler to lower the temperature of the enriched air by heat exchange relation with the backward returning nitrogen vapors so that when this liquefied air is subsequently passed through line 79 and expanded into the low pressure section 57 through valve 72, substantially little or no vaporization occurs. Simultaneously, with the removal of enriched air from section 71 a part of the nitrogen condensate from calandria 81 is withdrawn from try 86 and conducted through line 75 to subcooler 61 wherein it also is cooled to a temperature sufficiently low to suppress material vaporization upon being taken through line 80 and expanded in valve 73 into the top of fractionator 58.

Rectification of the expanded vaporous air from expander 53 and the liquefied components delivered from section 71 through valves 72 and 73, takes place on the vapor-liquid contacting trays in the low pressure section 57 at about 9 pounds per square inch gauge. The liquid bottoms product of this rectification, being substantially pure oxygen accumulates at a temperature of about —290° F. in a pool surrounding the tubes of calandria 81. Vaporization of the oxygen liquid is brought about as the result of condensation of nitrogen vapors within the tubes of this calandria to provide rising vapors for section 57 and to supply the product oxygen vapors which are removed from the fractionator through line 87 at a point immediately above the surface of the liquefied oxygen. These vapors pass from the fractionator at a temperature of —290° F. and are carried by way of line 87 to reversing exchanger 18 wherein they are conducted through passageway 21 in counter-current heat exchange relation with the fresh supply of incoming compressed air. Having thus been warmed in this heat exchange the vapors of the oxygen-rich component are withdrawn from exchanger 18 by way of line 88 through valve 89 at a temperature of about 85° F. and under an outlet pressure of about 3 pounds per square inch gauge.

The nitrogen-rich vapors are taken overhead from fractionator 58 through line 60 at a temperature of approximately —313° F. These vapors are first brought into heat exchange with the enriched air and liquefied nitrogen subcoolers 61 and 61' so that they are at about —280° F. when they flow through line 62 to heat exchanger 35. The partially warmed nitrogen-rich vapors enter into a heat exchange relation with the compressed air from passageway 22 in this exchanger and are further warmed to —272° F. At this latter temperature, the nitrogen-rich vapors flow through line 63 into the automatic reversing valve 25 which controls fluid flow into the cold end of reversing exchanger 18.

During the period of time when reversing valves 15 and 23 are actuated to cause the compressed air stream to flow through passageway 16 of exchanger 18 and to leave the exchanger by way of line 26, reversing valve 25 is automatically actuated to cause the backward-returning nitrogen-rich vapors to flow through line 27 and through passageway 17 of the heat exchanger. Having been warmed by its counter-current heat exchange with the incoming compressed air in passageway 16 to a temperature of about 85° F., the nitrogen-rich vapors are then withdrawn from the reversing heat exchanger and from the system through line 20, reversing valve 23 and line 24.

What is claimed is:

1. In starting up a low temperature fractionating unit for separating carbon dioxide-containing air wherein an expansion turbine engine stage is employed to expand and further lower the temperature of a portion of a stream of incoming compressed feed air from a reversing heat exchange stage in which stage said portion is cooled by heat exchange relation with backward-returning effluent components of the fractionation stage, the steps of passing all of the air outflowing from said reversing heat exchange stage through carbon dioxide adsorbent material and then successively through the expansion engine, fractionation stage and in backward-return through the reversing heat exchange stage until a temperature below about —200° F. is attained by the stream of compressed air flowing from said reversing heat exchange stage and said carbon dioxide content becomes substantially completely precipitated in the last-mentioned stage, and thereafter passing only the portion of the stream of compressed feed air to be expanded in said expansion engine stage through said adsorbent.

2. The method of starting up a process for separating air, containing water and carbon dioxide as impurities, in a two-pressure stage fractionating zone in which process a turbine-expansion step is employed to expand and further cool a portion of a stream of compressed air passing to one of the stages of the fractionation zone, comprising introducing compressed air into a reversing heat exchange step, passing outflowing air from the heat exchange step through solid adsorbent material to remove vaporous water from the air, cooling the dried air by expanding it in a turbine-expansion step, introducing the expanded air into the lower-pressure one of the fractionation stages thereby producing cooling of said stage, removing and passing vapors from the last-mentioned stage to the reversing heat exchange step for heat exchange relationship therein with the compressed air, gradually lowering the temperature of said vapors to below about —40° F. whereupon the air is cooled sufficiently by said heat exchange relation to effect a resultant precipitation of ice in the heat exchange step, continuing supplying the vapors from said fractionation stage to the heat exchange step and further lowering the temperature thereof to about —100° F. whereby the compressed air resultantly is cooled substantially below the freezing point of water, then separating outflowing air from the heat exchange step into portions, passing one of said portions directly to the higher-pressure fractionation stage, simultaneously maintaining flow of another of said portions successively through the solid adsorbent material and the expansion step into said lower pressure stage for fractionation thereby removing vaporous carbon dioxide from the air about to be expanded, removing and passing at least one outflowing stream from the higher-pressure stage to the lower-pressure stage for fractionation, establishing fractionation conditions in both fractionation stages by gradually reducing the temperature condition therein and continuing flow of vapors from the lower-pressure stage to the heat exchange step at continually lower temperatures until said vapors attain a temperature of about —270° F. thereby resultantly effecting carbon dioxide precipitation from incoming compressed air during passage of the air through the heat exchange step, and thereafter maintaining the separated portions of the outflowing air from the heat exchange step substantially free of impurity by reason of the precipitation of the water and carbon dioxide impurities in the heat exchange step.

3. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled by indirect countercurrent heat exchange with an outflowing product stream leaving said system at a post-expansion pressure through said reversing heat exchange zone, said inflowing and outflowing streams being flowed alternately with each other through periodically reversing paths in a heat exchange relation in said reversing heat exchange zone, and wherein at least a portion of the gas flowing within said fractionating system under a pre-expansion pressure is expanded to a post-expansion pressure in a rotating expansion engine, a method for starting up said system without condensation of condensable impurities within said expansion engine which includes the steps of: passing all said inflowing compressed gaseous mixture from said reversing heat exchange zone over a solid adsorbent material and through said expansion engine during the initial part of the starting-up period to refrigerate said inflowing mixture within said expansion engine without condensation of impurities therein; flowing said regrigerated mixture out of said fractionating system through said reversing heat exchange zone to cool said zone to a temperature sufficiently low to cause the precipitation of said impurities from said inflowing compressed mixture within said heat exchange zone; then separating said inflowing compressed gaseous mixture into a minor portion which continues to pass through said expansion engine, and a major portion which enters a liquefying zone within said fractionating system without passing through an expansion engine.

4. In a process for fractionating air in a low-temperature expansion and fractionating system, wherein an inflowing charge stream of compressed air enters said system at a pre-expansion pressure from a reversing heat exchange zone in which said inflowing air is cooled and in a cold part of which condensable impurities are precipitated, and wherein an outflowing product stream leaves said system at a post-expansion pressure through said reversing heat exchange zone, absorbing heat and scavenging said precipitated impurities by revaporization, said inflowing and outflowing streams being flowed countercurrently and alternately with each other through periodically reversing paths in a heat exchange relation in said reversing heat exchange zone, and wherein some of the air is fractionated and liquefied in a fractionating zone under pre-expansion pressure and some air is fractionated and liquefied in a fractionating zone under post-expansion pressure, and wherein at least a portion of the air entering said fractionating system is expanded to post-expansion pressure in a rotating expansion engine, a method for starting up said expansion and fractionating system from atmospheric temperatures, which includes the steps of: passing all of said inflowing compressed air over a solid adsorbent material to remove condensable impurities during the first part of the starting-up period; passing said purified compressed air through said expansion engine to expand said air to a post-expansion pressure with accompanying performance of work and cooling of the air; passing said cooled air out of said fractionating system through said reversing heat exchange zone until said zone is cooled sufficiently to precipitate said condensable impurities from said inflowing compressed stream within said reversing heat exchange zone; and then separating said inflowing gaseous stream into a minor portion which continues to pass through said expansion engine and supply refrigeration, and a major portion which goes directly to said pre-expansion fractionation zone.

HOWARD B. GOFF.
WALTER E. LOBO.

REFERENCES CITED

The following references are of record in the file of this patent:

UNITED STATES PATENTS

| Number | Name | Date |
|---|---|---|
| 1,157,959 | Place | Oct. 26, 1915 |
| 1,810,312 | Hasche | June 16, 1931 |
| 2,093,805 | De Baufre | Sept. 21, 1937 |
| 2,256,421 | Borchart | Sept. 16, 1941 |
| 2,270,852 | Schuftan | Jan. 27, 1942 |
| 2,287,158 | Yendall | June 23, 1942 |
| 2,337,474 | Kornemann et al. | Dec. 21, 1943 |
| 2,460,859 | Trumpler | Feb. 8, 1949 |
| 2,503,939 | De Baufre | Apr. 11, 1950 |
| 2,525,660 | Fausek | Oct. 10, 1950 |
| 2,584,381 | Dodge | Feb. 5, 1952 |